United States Patent
Ochida et al.

(10) Patent No.: US 10,571,910 B2
(45) Date of Patent: Feb. 25, 2020

(54) VEHICLE CONTROL DEVICE

(71) Applicant: HONDA MOTOR CO., LTD., Minato-ku, Tokyo (JP)

(72) Inventors: Jun Ochida, Wako (JP); Tadahiko Kanou, Wako (JP); Takashi Kuboshima, Wako (JP); Ken Hanayama, Wako (JP); Hiroaki Horii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 163 days.

(21) Appl. No.: 15/838,619

(22) Filed: Dec. 12, 2017

(65) Prior Publication Data

US 2018/0173226 A1    Jun. 21, 2018

(30) Foreign Application Priority Data

Dec. 16, 2016   (JP) .................................. 2016-243929

(51) Int. Cl.
*G05D 1/00*    (2006.01)
*G05D 1/02*    (2006.01)
(Continued)

(52) U.S. Cl.
CPC ..... *G05D 1/0061* (2013.01); *B60W 30/18163* (2013.01); *B60W 50/14* (2013.01); *G05D 1/0223* (2013.01); *B60W 2050/0075* (2013.01); *B60W 2520/105* (2013.01); *B60W 2520/125* (2013.01); *B60W 2520/14* (2013.01); *B60W 2720/125* (2013.01)

(58) Field of Classification Search
CPC .............. G05D 1/0061; G05D 1/0223; B60W 30/18163; B60W 50/14; B60W 2050/0075; B60W 2720/125; B60W 2520/14; B60W 2520/125; B60W 2520/105

See application file for complete search history.

(56) References Cited

U.S. PATENT DOCUMENTS

2005/0096828 A1   5/2005 Uemura et al.
2013/0002416 A1*  1/2013 Gazit ....................... B62D 1/28
                                                340/438
(Continued)

FOREIGN PATENT DOCUMENTS

JP          10-250508         9/1998
JP          2005-132184       5/2005
(Continued)

OTHER PUBLICATIONS

Japanese Office Action for Japanese Patent Application No. 2016-243929 dated Jun. 5, 2018.

*Primary Examiner* — Russell Frejd
(74) *Attorney, Agent, or Firm* — Amin, Turocy & Watson, LLP

(57) ABSTRACT

A vehicle motion determining unit determines a value indicative of a motion of the vehicle that occurs in the vehicle transverse direction of a host vehicle, on the basis of a planned travel trajectory generated by a trajectory generating unit at a time of making a lane change. The grasping request unit outputs a grasping request to the notification control unit to request grasping of the steering wheel in the case that the value indicative of the vehicle motion is greater than or equal to a predetermined value.

6 Claims, 7 Drawing Sheets

(51) Int. Cl.
*B60W 30/18* (2012.01)
*B60W 50/14* (2012.01)
*B60W 50/00* (2006.01)

(56) References Cited

U.S. PATENT DOCUMENTS

2015/0032322 A1* 1/2015 Wimmer ............. B60W 30/143
                                                  701/23
2019/0039627 A1* 2/2019 Yamamoto ........... G08G 1/0962

FOREIGN PATENT DOCUMENTS

| | | |
|---|---|---|
| JP | 2006-131108 | 5/2006 |
| JP | 2009-042834 | 2/2009 |

* cited by examiner

VEHICLE CONTROL DEVICE

CROSS-REFERENCE TO RELATED APPLICATION

This application is based upon and claims the benefit of priority from Japanese Patent Application No. 2016-243929 filed on Dec. 16, 2016, the contents of which are incorporated herein by reference.

BACKGROUND OF THE INVENTION

Field of the Invention

The present invention relates to a vehicle control device which is disposed in a host vehicle that is capable of making a lane change automatically.

Description of the Related Art

In Japanese Laid-Open Patent Publication No. 2009-042834, a device is disclosed which, in the event that a direction indicator switch is operated by the driver, detects whether or not another vehicle exists at a destination where a lane change is to be made, and if another vehicle exists at the destination, prohibits the lane change from being made, together with issuing a notification to the driver regarding the lane change prohibition. In Japanese Laid-Open Patent Publication No. 10-250508, a device is disclosed which, in the event that the driver has operated the direction indicator switch, judges the safety of making a lane change in accordance with the road conditions, and issues a notification to the driver of the judgment result.

SUMMARY OF THE INVENTION

In the case that a driver's own vehicle (hereinafter also referred to as a host vehicle) changes lanes in the same direction that the vehicle is turning along a curve, a lateral G force caused by the lane change also occurs in addition to a lateral G force caused by turning. At this time, a large lateral G force is generated in the host vehicle. In the case that the host vehicle is an automatically driven vehicle, situations occur during which the driver is not grasping the steering wheel, and if such a large lateral G force occurs at a curve, the riding posture with which the driver is seated in the vehicle may collapse or fall into disarray.

The present invention has been devised taking into consideration the aforementioned problem, and has the object of providing a vehicle control device which is capable of maintaining the riding posture of a driver, even in the event that a large lateral G force is generated due to making a lane change during automated driving.

The present invention is characterized by a vehicle control device disposed in a vehicle and which is capable of making a lane change automatically, comprising a trajectory generating unit adapted to generate a planned travel trajectory for the vehicle at a time of making a lane change, a vehicle motion determining unit adapted to determine a value indicative of a motion of the vehicle that occurs in a vehicle transverse direction of the vehicle, on the basis of the planned travel trajectory generated by the trajectory generating unit, and a grasping request unit adapted to request grasping of a steering wheel in the case that the value indicative of the vehicle motion is greater than or equal to a predetermined value. In accordance with this configuration, in the case that movement of the vehicle in the vehicle transverse direction increases due to making the lane change, it is possible to request that the driver grasp the steering wheel, and therefore, the driver can ride in an appropriate posture suitable for operating the vehicle. More specifically, by grasping the steering wheel, the driver can resist the lateral G force.

The vehicle further comprises a lateral G sensor adapted to detect a lateral G force as a value indicative of the vehicle motion.

The vehicle control device further comprises a yaw rate sensor adapted to detect an angular velocity about a vertical axis as a value indicative of the vehicle motion.

The vehicle control device may further comprise a vehicle control unit adapted to automatically control the motion of the vehicle at a time of making a lane change, and a grasping detection unit adapted to detect whether or not the steering wheel is grasped by the driver of the vehicle, wherein the vehicle control unit may change the motion of the vehicle differently based on whether it is detected or whether it is not detected by the grasping detection unit that the steering wheel is grasped, after grasping of the steering wheel has been requested by the grasping request unit. In accordance with such a configuration, an appropriate vehicle control can be performed depending on the state at which the steering wheel is grasped by the driver.

The grasping detection unit may detect a level at which the steering wheel is grasped, and the vehicle control unit may control the motion of the vehicle in accordance with the level detected by the grasping detection unit. In accordance with such a configuration, an appropriate vehicle control can be performed depending on the level at which the steering wheel is grasped by the driver, for example, whether the steering wheel is being grasped with one hand or with both hands.

In the case that a degree of deceleration, which is greater than or equal to a predetermined deceleration, is required to make the motion of the vehicle an acceptable vehicle motion, the vehicle control unit may stop the automated control that carries out the lane change. In accordance with this configuration, an excessive deceleration due to making the lane change can be suppressed, and traveling can be performed in accordance with the intention of a driver who does not desire to decelerate.

The vehicle control device may further comprise a notification control unit adapted to issue a notification that a deceleration control is being performed, in the case that the deceleration control for the vehicle is to be carried out by the vehicle control unit. In accordance with this configuration, it is possible to cause a driver who does not desire to decelerate to select to take over responsibility for driving in advance.

According to the present invention, it is possible for the driver to maintain an appropriate riding posture suitable for the motion of the vehicle. More specifically, by grasping the steering wheel, the driver can resist the lateral G force.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a vehicle control device according to the present invention will be presented and described in detail below with reference to the accompanying drawings.

[1. Configuration of Vehicle Control System 10]

The vehicle control device according to the present invention constitutes a portion of a vehicle control system that is installed in a host vehicle. A description of the vehicle control device will be presented below together with a description of the vehicle control system.

[1.1 Overall Configuration]

Figure 1:
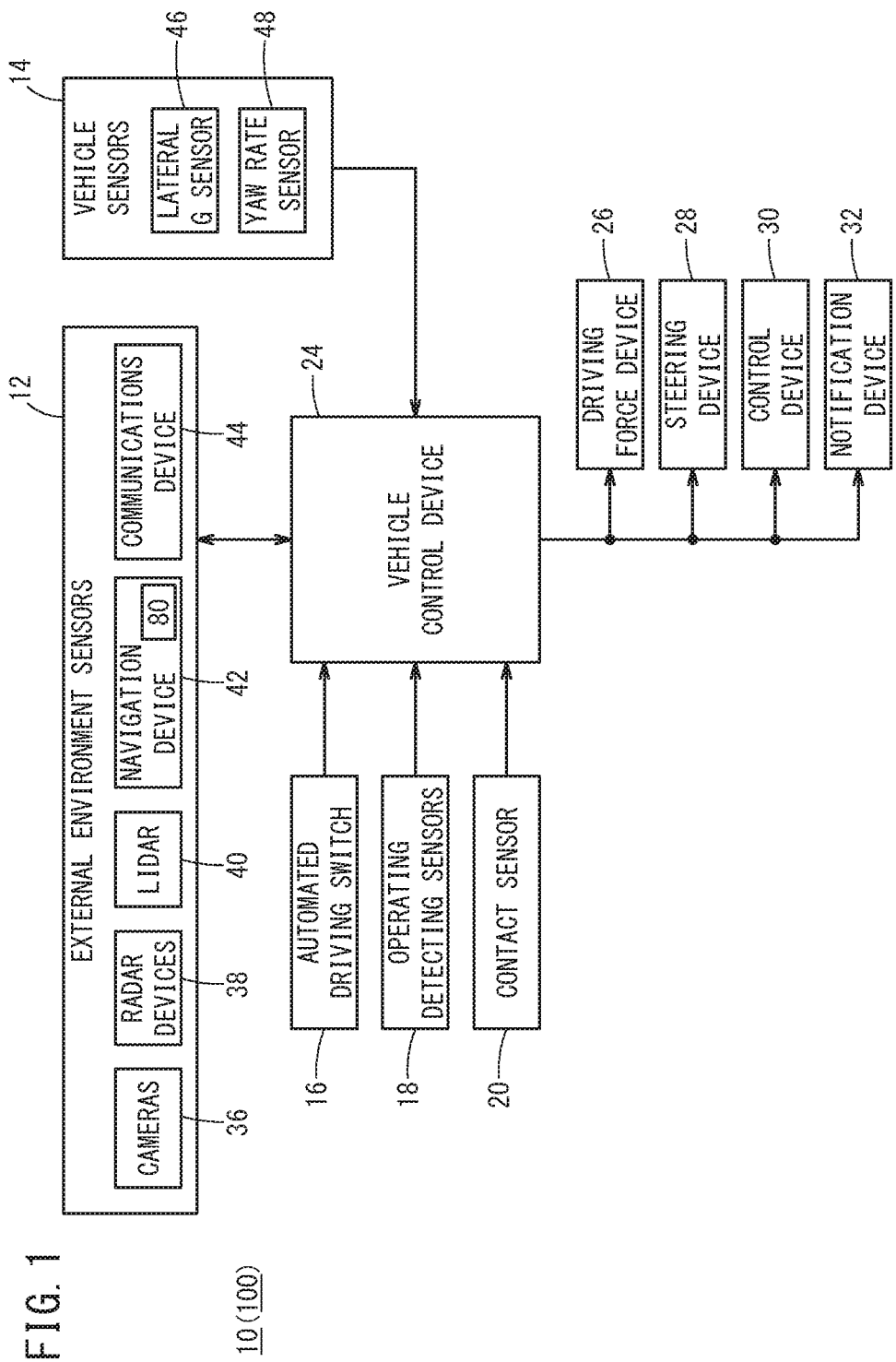
FIG. 1 is a block diagram showing a configuration of a vehicle control system equipped with a vehicle control device according to the present invention.

The vehicle control system 10 will now be described with reference to FIG. 1. The vehicle control system 10 is incorporated in a host vehicle 100, and performs a travel control for the host vehicle 100 by way of automated driving or manual driving. The term "automated driving" as used herein implies a concept that includes not only "fully automated driving" in which the travel control for the host vehicle 100 is performed entirely automatically, but also "partial automated driving" or "driving assistance" in which the travel control is partially performed automatically.

The vehicle control system 10 is basically made up from an input system device group, a vehicle control device 24, and an output system device group. The respective devices of the input system device group and the output system device group are connected via communication lines to the vehicle control device 24.

The input system device group includes external environment sensors 12, vehicle sensors 14, an automated driving switch 16, operation detecting sensors 18, and a contact sensor 20. The output system device group includes a driving force device 26 for driving the vehicle wheels (not shown), a steering device 28 for steering the vehicle wheels, a braking device 30 for braking the vehicle wheels, and a notification device 32 for notifying the driver primarily through visual and auditory sensation.

[1.2 Specific Configuration of Input Device Group]

The external environment sensors 12 acquire information (hereinafter referred to as external environmental information) indicative of the state of the external environment around the host vehicle 100, and output the acquired external environmental information to the vehicle control device 24. More specifically, the external environment sensors 12 are configured to include one or more cameras 36, one or more radar devices 38, one or more LIDAR devices 40 (Light Detection and Ranging; Laser Imaging Detection and Ranging), a navigation device 42, and a communications device 44.

The navigation device 42 is constituted to include a positioning device, which measures a position of the host vehicle 100 using a satellite or the like, a storage device 50 that stores map information 80, a user interface (for example, a touch panel display, a speaker, and a microphone). The navigation device 42, using the positioning device and the map information 80, generates a travel route from the position of the host vehicle 100 to a destination point designated by the user. The position information of the host vehicle 100 and information concerning the travel route are output to the vehicle control device 24.

The communications device 44 is configured to be capable of communicating with external devices including roadside devices, other vehicles, and a server, and transmits and receives, for example, information related to traffic facilities (traffic signals, etc.), information related to other vehicles, probe information, or the most recent map information 80. Each of such information is output to the vehicle control device 24.

The vehicle sensors 14 include a lateral G sensor 46 that detects a lateral G force, and a yaw rate sensor 48 that detects an angular velocity about a vertical axis. The lateral G force and the yaw rate are values indicative of the vehicle motion in a vehicle widthwise direction (lateral direction) of the host vehicle 100. The vehicle sensors 14 also include, in addition thereto, other non-illustrated sensors, such as a velocity sensor for detecting a vehicle velocity (vehicle speed) V, an acceleration sensor for detecting an acceleration, an azimuth sensor for detecting a direction and orientation, and a gradient sensor for detecting a gradient of the host vehicle 100. Signals detected by the respective sensors are output to the vehicle control device 24.

The automated driving switch 16, for example, is a switch provided on the steering wheel or an instrument panel or the like. The automated driving switch 16 is configured to be capable of switching between a plurality of driving modes, by manual operation thereof by a user including the driver. The automated driving switch 16 outputs a mode switching signal to the vehicle control device 24.

The operation detecting sensors 18 detect the presence or absence of operations by the driver, operation amounts, operation positions, and the like, for the various non-illustrated operating devices. The operation detecting sensors 18 include an accelerator pedal sensor for detecting an amount or the like by which the accelerator pedal is operated, a brake pedal sensor for detecting an amount or the like by which the brake pedal is operated, a torque sensor for detecting a steering torque input by the steering wheel, and a direction indicator sensor for detecting a direction in which the direction indicator (turn signal) switch is operated. Signals detected by the respective sensors are output to the vehicle control device 24.

The contact sensor 20 detects the state at which the steering wheel is grasped by the driver. The contact sensor 20 is constituted, for example, by an electrostatic capacity sensor, a pressure sensor, or the like. In order to detect whether the driver is grasping the steering wheel with both hands or with one hand, a plurality of respective sensors are provided along a circumferential direction of the steering wheel. However, in the case of an electrostatic capacity sensor, since it is possible to distinguish between grasping with two hands and grasping with one hand by a difference in the electrostatic capacity value, a single electrostatic capacity sensor may be provided along the circumferential direction of the steering wheel. Moreover, instead of a contact sensor 20, a vehicle interior camera may be provided, whereby the state at which the driver grasps the steering wheel can be recognized.

[1.3 Specific Configuration of Output System Device Group]

The driving force device 26 is constituted from a driving force ECU (Electronic Control Unit), and a drive source including an engine and/or a driving motor. The driving force device 26 generates a travel driving force (torque) for the host vehicle 100 in accordance with vehicle control values output from the vehicle control device 24, and transmits the travel driving force to the vehicle wheels directly or through a transmission.

The steering device 28 is constituted from an EPS (electric power steering system) ECU, and an EPS actuator. The steering device 28 changes the orientation of the vehicle wheels (steered wheels) in accordance with vehicle control values output from the vehicle control device 24.

The braking device 30, for example, is an electric servo brake used in combination with a hydraulic brake, and is made up from a brake ECU and a brake actuator. The braking device 30 brakes the vehicle wheels in accordance with vehicle control values output from the vehicle control device 24.

The notification device 32 is made up from a notification ECU, a display device, an audio device, and a haptic (tactile sensory) device. The notification device 32 carries out a notifying operation to provide a notification in relation to automated driving or manual driving, in accordance with a notification command output from the vehicle control device 24. When the notifying operation is performed, the notification ECU controls one or more of the display device, the acoustic device, and the haptic device. At this time, the notification ECU may change the device that is operated or the operations thereof per se in accordance with the notified content.

[1.4 Driving Modes]

The automated driving mode is a driving mode in which the host vehicle 100 travels under the control of the vehicle control device 24, in a state in which the driver does not operate the operating devices (specifically, the accelerator pedal, the steering wheel, and the brake pedal). Stated otherwise, in the automated driving mode, the vehicle control device 24 controls a portion or all of the driving force device 26, the steering device 28, and the braking device 30 in accordance with sequentially created action plans. When the driver performs a predetermined operation using the operating devices during implementation of the automated driving mode, the automated driving mode is canceled automatically, together with switching to a driving mode (including a manual driving mode) in which the level of driving automation is relatively low.

[1.5. Configuration of Vehicle Control Device 24]

Figure 2:
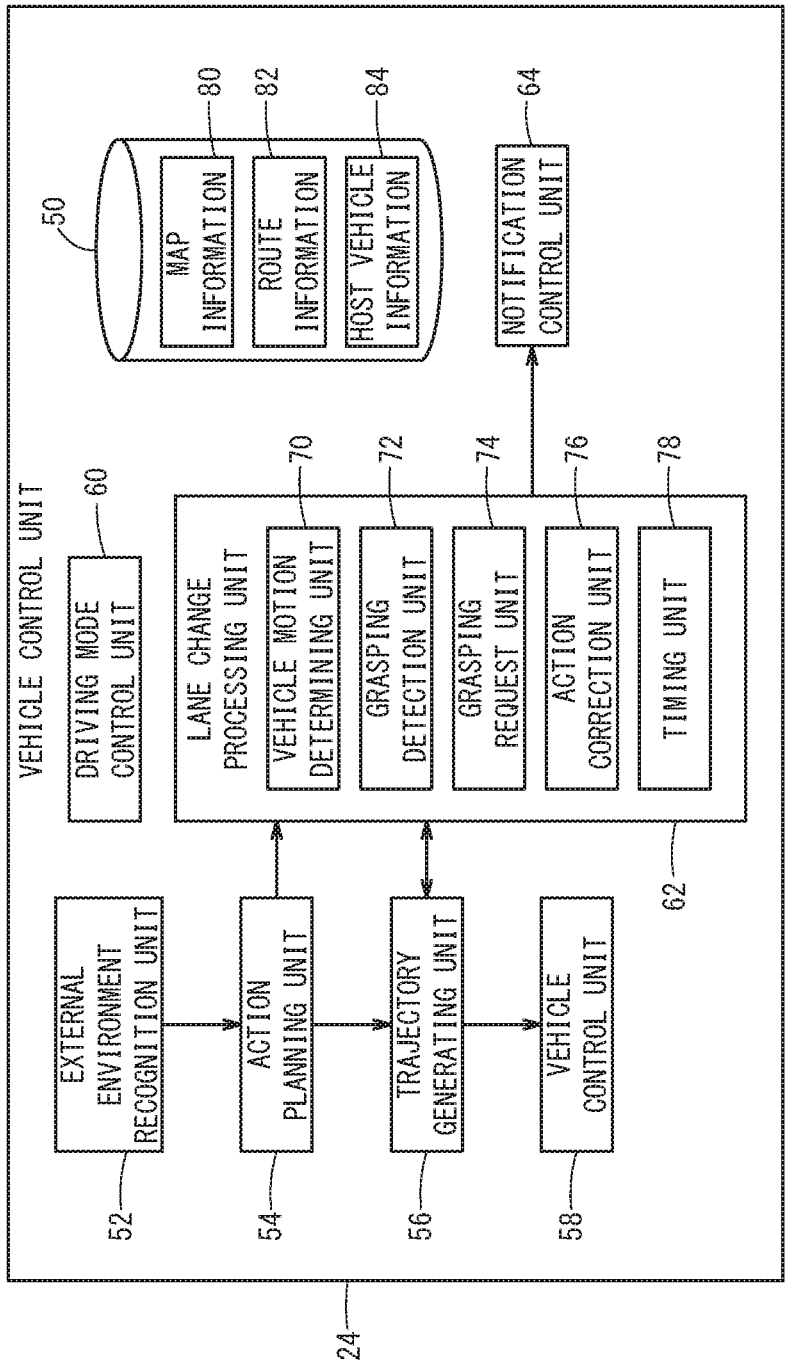
FIG. 2 is a block diagram showing a configuration of the vehicle control device according to an embodiment of the present invention.

The vehicle control device 24 will now be described with reference to FIG. 2. The vehicle control device 24 is constituted by one or a plurality of ECUs, and comprises the storage device 50 and various function realizing units. According to the present embodiment, the function realizing units are software-based functional units, in which the functions thereof are realized by a CPU (central processing unit) executing programs that are stored in the storage device 50. Alternatively, the function realizing units may be hardware-based functional units made up from integrated circuits such as field-programmable gate arrays (FPGA) or the like. The function realizing units include an external environment recognition unit 52, an action planning unit 54, a trajectory generating unit 56, a vehicle control unit 58, a driving mode control unit 60, a lane change processing unit 62, and a notification control unit 64.

The external environment recognition unit 52 recognizes static external environmental information around the periphery of the host vehicle 100, and generates external environment recognition information, using the external environmental information acquired by the external environment sensors 12, and the map information 80 stored in the storage device 50 among other things. Static external environmental information includes recognized objects such as lane markings, stop lines, traffic signals, traffic signs, geographic features (real estate), travel capable regions, evacuation areas, and the like. Further, the static external environmental information also includes position information for each of the recognized objects. The external environment recognition unit 52 recognizes dynamic external environmental information around the periphery of the host vehicle 100, and generates external environment recognition information, using the external environmental information acquired by the external environment sensors 12. The dynamic external environmental information includes, for example, obstacles such as parked or stopped vehicles, traffic participants such as pedestrians and other vehicles (including bicycles), etc., and traffic signals (light colors of the traffic signals), and the like. Further, the dynamic external environmental information also includes information on directions of movement of each of the recognized objects.

On the basis of the recognition results from the external environment recognition unit 52, the action planning unit 54 creates action plans (a time series of events) for each of respective travel segments, and updates the action plans as needed. As types of events, for example, there may be cited events in relation to deceleration, acceleration, branching, merging, lane keeping, lane changing, and passing other vehicles. In this instance, "deceleration" and "acceleration" are events in which the host vehicle 100 is made to decelerate or accelerate. "Branching" and "merging" are events in which the host vehicle 100 is made to travel smoothly at a branching point or a merging point. "Lane changing" is an event in which a change is made to the travel lane of the host vehicle 100. "Passing" is an event in which a preceding other vehicle is overtaken by the host vehicle 100. Further, "lane keeping" is an event in which the host vehicle 100 is made to travel without departing from the travel lane, and is subdivided into a combination of travel modes. More specifically, as such travel modes, there may be included constant speed traveling, follow-on traveling, traveling while decelerating, traveling through a curve, or traveling to avoid obstacles.

Using the map information 80, the route information 82, and the host vehicle information 84, which are read out from the storage device 50, the trajectory generating unit 56 generates a planned travel trajectory in accordance with the action plan created by the action planning unit 54. The planned travel trajectory is data indicative of a time series of target vehicle behaviors, and more specifically, is a time series data set, in which the data units thereof are defined by a position, a posture angle, a velocity, an acceleration or deceleration, a curvature, a yaw rate, a steering angle, and a lateral G force.

The vehicle control unit 58 determines respective vehicle control values in order to control traveling of the host vehicle 100, in accordance with the planned travel trajectory generated by the trajectory generating unit 56. In addition, the vehicle control unit 58 outputs the determined vehicle control values, respectively, to the driving force device 26, the steering device 28, and the braking device 30.

In accordance with a signal output from the automated driving switch 16, the driving mode control unit 60 performs a transition process to transition from the manual driving mode to the automated driving mode, or a transition process to transition from the automated driving mode to the manual driving mode. Further, the driving mode control unit 60 performs a transition process to transition from the automated driving mode to the manual driving mode, in accordance with signals output from the operation detecting sensors 18.

The lane change processing unit 62 performs a process at the time of making a lane change. The lane change processing unit 62 functions as a vehicle motion determining unit 70, a grasping detection unit 72, a grasping request unit 74, an action correction unit 76, and a timing unit 78.

The vehicle motion determining unit 70 determines a value indicative of a motion of the vehicle (a lateral G force or a yaw rate) that occurs in the vehicle transverse direction of the host vehicle 100, as well as a deceleration of the host vehicle 100, on the basis of the planned travel trajectory generated by the trajectory generating unit 56. The grasping detection unit 72 detects whether or not the steering wheel is being grasped by the driver of the host vehicle 100, based on a detection result from the contact sensor 20 (or image information from the vehicle interior camera). Furthermore, in the case that the steering wheel is being grasped, it is detected whether grasping is done with one hand or with both hands. The grasping request unit 74 transmits a grasping request to the notification control unit 64 in order to request grasping of the steering wheel by the driver, in the case that the value indicative of the vehicle motion, which was determined by the vehicle motion determining unit 70, is greater than or equal to a predetermined value. The action correcting unit 76 modifies the action plan created by the action planning unit 54, and transmits the corrected action plan to the trajectory generating unit 56, together with sending a notification request to the notification control unit 64. The timing unit 78 measures a duration T of the grasping request.

In the case that a transition process is carried out by the driving mode control unit 60 from the automated driving mode to the manual driving mode, or in the case that a takeover request is performed to request that the responsibility for driving be taken over by the driver, or in the case that a request instruction from the grasping request unit 74 is received, the notification control unit 64 outputs a notification command with respect to the notification device 32.

The storage device 50 stores the map information 80, the route information 82, and the host vehicle information 84. The map information 80 is information output from the navigation device 42 or the communications device 44. The route information 82 is information concerning the planned travel route that is output from the navigation device 42. The host vehicle information 84 includes respective detection values output from the vehicle sensors 14. The storage device 50 also stores various numerical values used by the vehicle control device 24.

[2. Processes Performed by Vehicle Control Device 24]

Processes performed by the vehicle control device 24 will now be described with reference to FIGS. 3 and 4. The processes described below are executed periodically. In the following processes (step S4, etc.), the lateral G force is used as the value indicative of the vehicle motion in the vehicle transverse direction, however, a yaw rate may also be used.

In step S1, a determination is made as to whether or not automated driving is currently in progress. In the case that automated driving is in progress (step S1: YES), the process proceeds to step S2. On the other hand, in the case that automated driving is not in progress (step S1: NO), processing is temporarily terminated.

In step S2, various types of information are acquired. The vehicle control device 24 obtains the external environmental information from the external environment sensors 12, and acquires various signals from the vehicle sensors 14. The action planning unit 54 creates an action plan on the basis of the recognition results from the external environment recognition unit 52, as well as the various signals from the vehicle sensors 14 and the like. Then, the action plan is transmitted to the trajectory generating unit 56.

In step S3, the trajectory generating unit 56 determines whether or not the action plan created by the action planning unit 54 involves making a lane change. In the case that a lane change is to be made (step S3: YES), the process proceeds to step S4. On the other hand, in the case that a lane change is not to be made (step S3: NO), a normal automated driving process is performed.

In step S4, the trajectory generating unit 56 generates a planned travel trajectory in accordance with the action plan (lane change) that was created by the action planning unit 54. In step S5, on the basis of the planned travel trajectory, the vehicle motion determining unit 70 determines a lateral G force, reads out a predetermined value (lateral G force threshold value) from the storage device 50, and compares the determined lateral G force with the predetermined value. In the case that the lateral G force is greater than or equal to the predetermined value (step S5: YES), the process proceeds to step S6. On the other hand, in the case that the lateral G force is less than the predetermined value (step S5: NO), the process proceeds to step S9.

In step S6, the grasping detection unit 72 detects whether or not the driver is grasping the steering wheel. In the case that the steering wheel is being grasped (step S6: grasping present), the process proceeds to step S7. On the other hand, in the case that the steering wheel is not being grasped (step S6: grasping absent), the process proceeds to step S10.

[2.1 Process if the Steering Wheel is being Grasped]

In step S7, the grasping detection unit 72 detects the state at which the steering wheel is being grasped by the driver. If a one hand grasping state is detected (step S7: one hand), the process proceeds to step S8. On the other hand, if a both hands grasping state is detected (step S7: both hands), the process proceeds to step S9.

In step S8, the notification control unit 64 outputs a notification instruction to provide notification that deceleration is to occur. Further, the vehicle control unit 58 decelerates the host vehicle 100 from its initial velocity (a target velocity of the planned travel trajectory generated in step S4), and then outputs respective vehicle control values to carry out a lane change. Specifically, the following processes are performed. The action correction unit 76 receives the detection result of the grasping detection unit 72, and transmits a notification request to provide a notification of the deceleration to the notification control unit 64. The notification control unit 64 receives the notification request, and outputs a notification command to the notification device 32. The notification device 32 notifies the driver that a deceleration is to be performed. Further, the action correction unit 76 corrects the action plan to a plan involving "deceleration+making a lane change" and transmits the corrected action plan to the trajectory generating unit 56. The trajectory generating unit 56 regenerates the planned travel trajectory in accordance with the corrected action plan. The vehicle control unit 58 determines respective vehicle control values in accordance with the planned travel trajectory that was regenerated, and outputs the respective vehicle control values to the driving force device 26, the steering device 28, and the braking device 30. The driving force device 26, the steering device 28, and the braking device 30 are operated in accordance with the respective vehicle control values.

In the case that a transition has occurred from step S5 or step S7 to step S9, the vehicle control unit 58 outputs the vehicle control values so that the host vehicle 100 is made to travel at the initial velocity (the target velocity of the planned travel trajectory generated in step S4) while also making a lane change. More specifically, the vehicle control unit 58 determines respective vehicle control values in accordance with the planned travel trajectory that was generated in step S4, and outputs the respective vehicle control values to the driving force device 26, the steering device 28, and the braking device 30. The driving force device 26, the steering device 28, and the braking device 30 are operated in accordance with the respective vehicle control values.

[2.2 Process if the Steering Wheel is not being Grasped]

Figure 4:
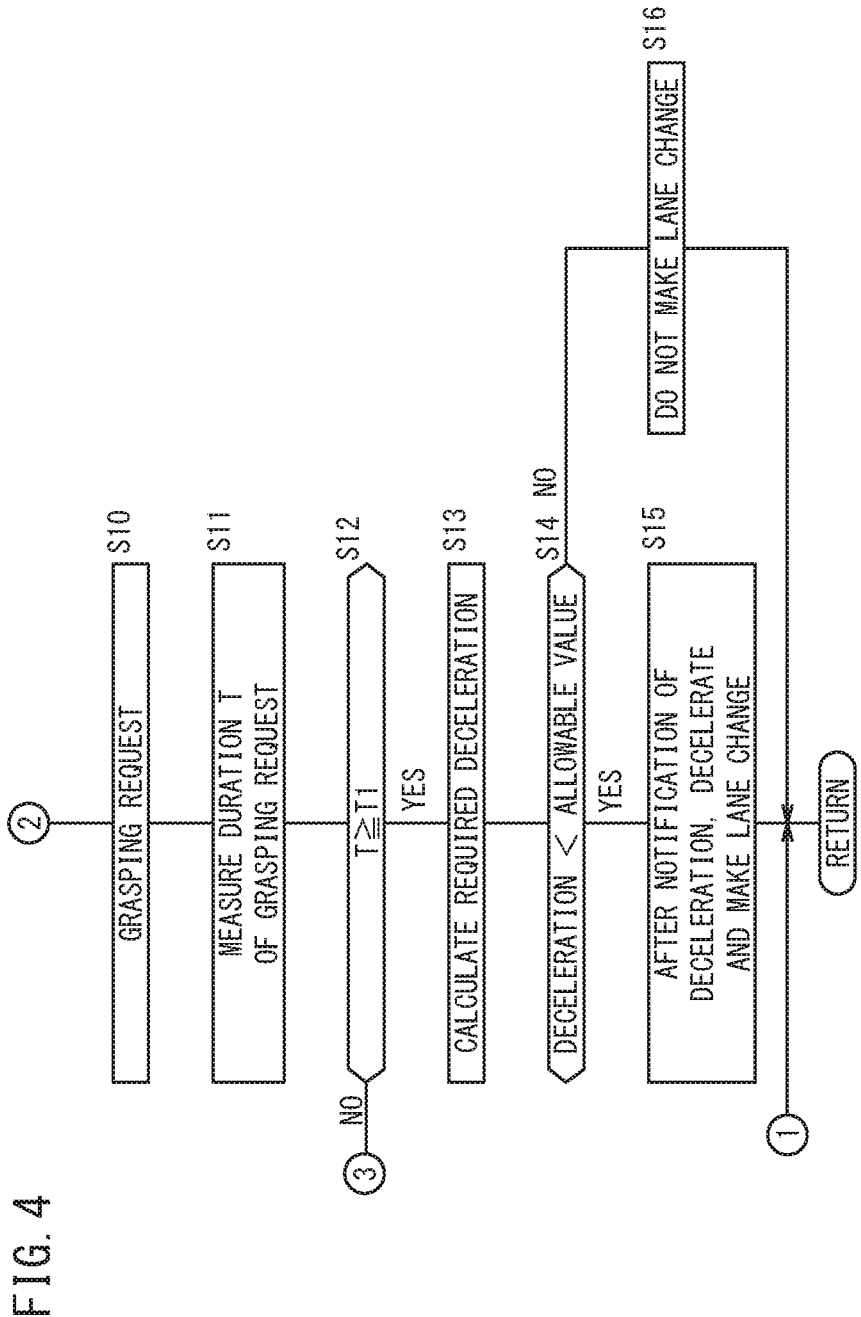
FIG. 4 is a further flowchart of the process performed by the vehicle control device.

The description of operations of the vehicle control device 24 will be continued with reference to FIG. 4. In the case of having transitioned from step S6 to step S10, the grasping request unit 74 transmits a grasping request to the notification control unit 64. The notification control unit 64 receives the grasping request, and outputs a grasping request command to the notification device 32. The notification device 32 issues a notification to prompt the driver to grasp the steering wheel.

In step S11, the timing unit 78 measures the duration T of the grasping request. In step S12, a comparison between the elapsed time T and a predetermined time period T1 is performed. If the elapsed time T is greater than or equal to the predetermined time period T1 (step S12: YES), the process proceeds to step S13. On the other hand, in the case that the elapsed time T is less than the predetermined time period T1 (step S12: NO), the process returns to step S6.

In the case of having transitioned from step S12 to step S13, or more specifically, if a grasped state is not detected even after the predetermined time period T1 has elapsed after the grasping request was made, the trajectory generating unit 56 calculates the deceleration. Specifically, the following processes are performed. The action correction unit 76 receives the detection result of the grasping detection unit 72, and the action correction unit 76 corrects the action plan to "deceleration+lane change (non-grasped state)" and transmits the corrected action plan to the trajectory generating unit 56. The trajectory generating unit 56 regenerates the planned travel trajectory in accordance with the corrected action plan. At this time, the trajectory generating unit 56 reflects the lateral G force, the velocity, and the deceleration of the vehicle in the planned travel trajectory, so that the driver who is not grasping the steering wheel can maintain a stable posture.

In step S14, on the basis of the planned travel trajectory that was regenerated, the vehicle motion determining unit 70 determines a degree of deceleration, and together therewith, reads out an allowable value (deceleration threshold value) from the storage device 50, and compares the degree of deceleration with the allowable value. In the case that the degree of deceleration is less than the allowable value (step S14: YES), the process proceeds to step S15. On the other hand, in the case that the degree of deceleration is greater than or equal to the allowable value (step S14: NO), the process proceeds to step S16.

In step S15, the notification control unit 64 outputs a notification instruction to provide notification that deceleration is to occur. Further, the vehicle control unit 58 decelerates the host vehicle 100 from its initial velocity (a target velocity of the planned travel trajectory generated in step S4), and then outputs respective vehicle control values to carry out a lane change. Specifically, the following processes are performed. The action correction unit 76 receives the determination result of the vehicle motion determining unit 70, and transmits a notification request to provide a notification of the deceleration to the notification control unit 64. The notification control unit 64 receives the notification request, and outputs a notification command to the notification device 32. The notification device 32 notifies the driver that a deceleration is to be performed. Further, the action correction unit 76 transmits an instruction to use the regenerated travel planned trajectory to the trajectory generating unit 56. The vehicle control unit 58 determines respective vehicle control values in accordance with the planned travel trajectory that was regenerated, and outputs the respective vehicle control values to the driving force device 26, the steering device 28, and the braking device 30. The driving force device 26, the steering device 28, and the braking device 30 are operated in accordance with the respective vehicle control values.

In the case of having transitioned from step S14 to step S16, the vehicle control unit 58 does not make a lane change. More specifically, the action correction unit 76 corrects the action plan to "lane keeping" and transmits the corrected action plan to the trajectory generating unit 56. The trajectory generating unit 56 regenerates the planned travel trajectory in accordance with the corrected action plan. The vehicle control unit 58 determines respective vehicle control values in accordance with the planned travel trajectory that was regenerated, and outputs the respective vehicle control values to the driving force device 26, the steering device 28, and the braking device 30. The driving force device 26, the steering device 28, and the braking device 30 are operated in accordance with the respective vehicle control values.

[3. Operations of Host Vehicle 100]

The lane change control which is carried out in the present embodiment is divided into the following patterns (1) through (5).

(1) Pattern 1

Figure 3:
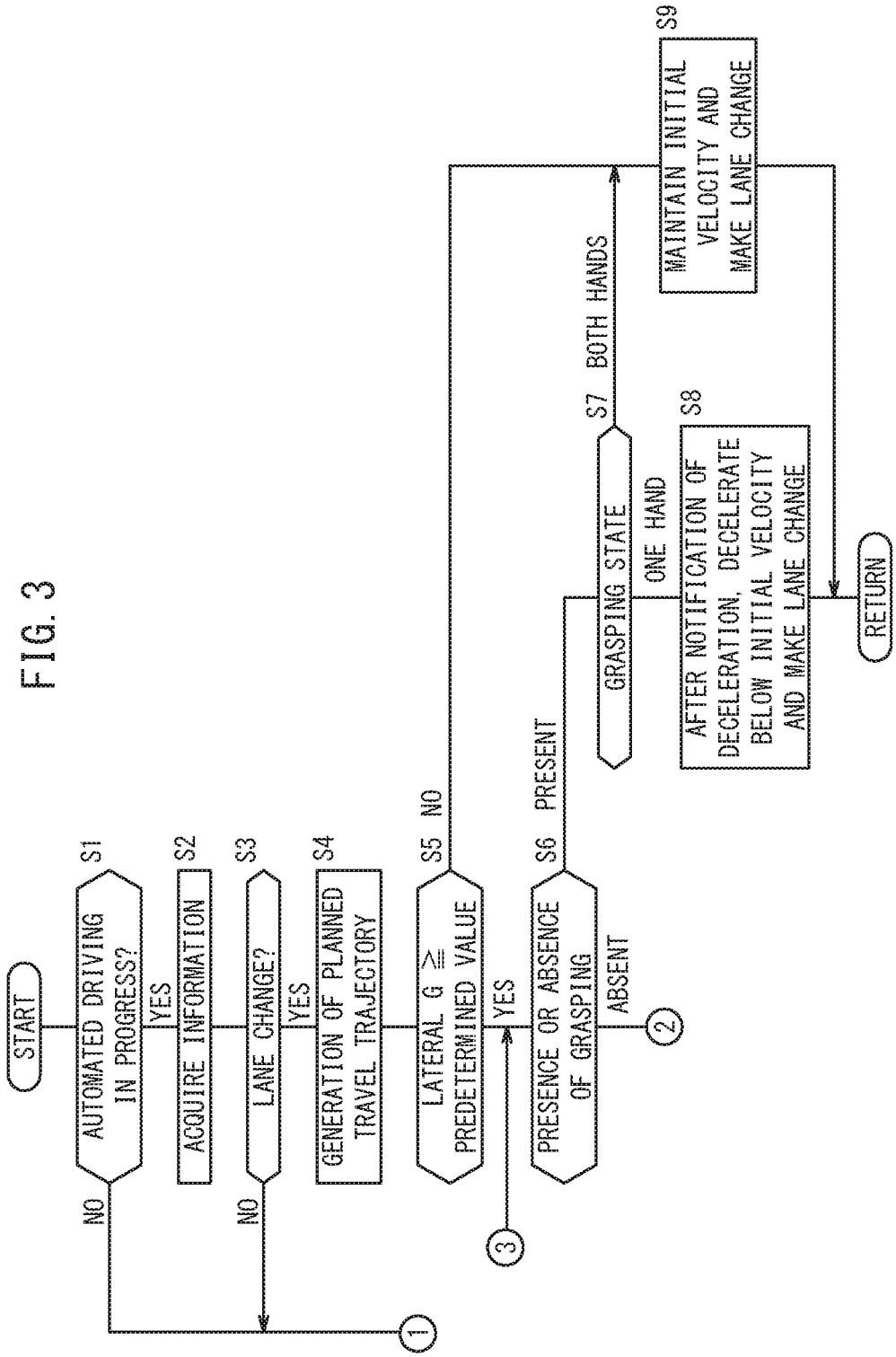
FIG. 3 is a flowchart of a process performed by the vehicle control device.
Figure 5:
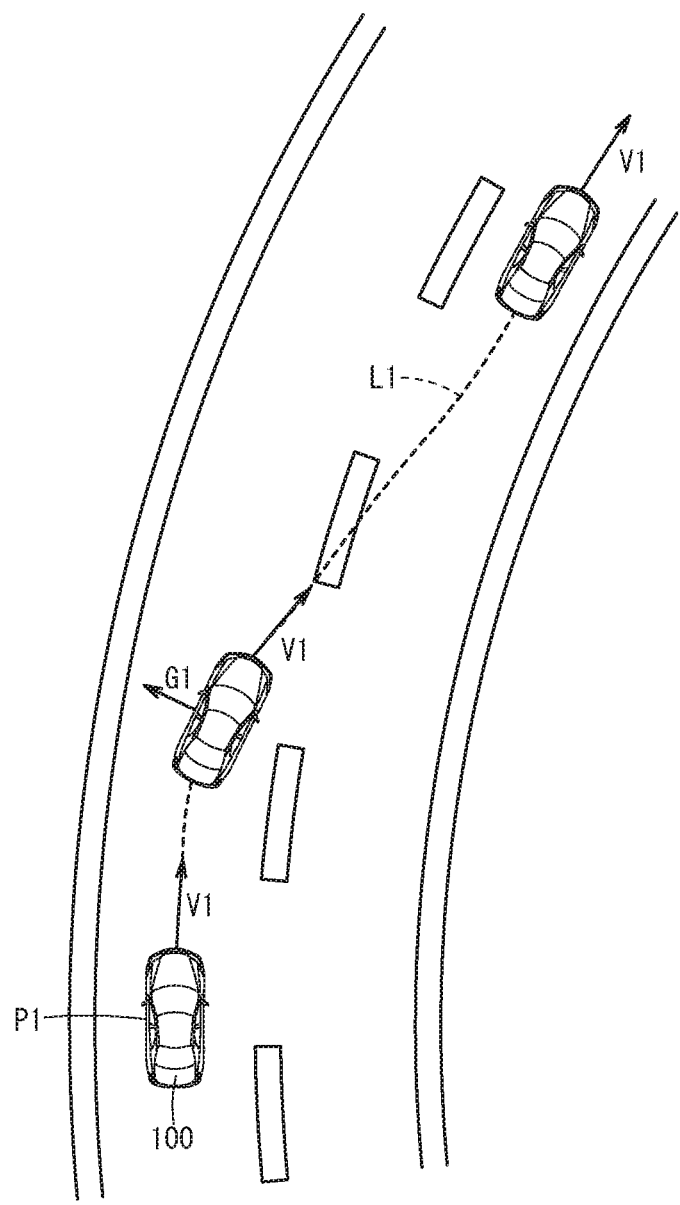
FIG. 5 is a diagram showing the state of a lane change performed in step S9 of FIG. 3.

FIG. 5 shows the state of a lane change performed in step S9 of FIG. 3. When the host vehicle 100 travels through the point P1, an action plan to effect a lane change is created. A planned travel trajectory L1 is created in accordance with creation of the action plan. If the lateral G force G1, which is set in the data of the planned travel trajectory L1, is less than a predetermined value (step S5 of FIG. 3: NO), the planned travel trajectory L1 is maintained. The host vehicle 100 performs a lane change at the travel velocity V1 in accordance with the planned travel trajectory L1. At this time, since the lateral G force G1 is less than the predetermined value, the driver is capable of maintaining a proper driving posture.

(2) Pattern 2

Figure 6A:
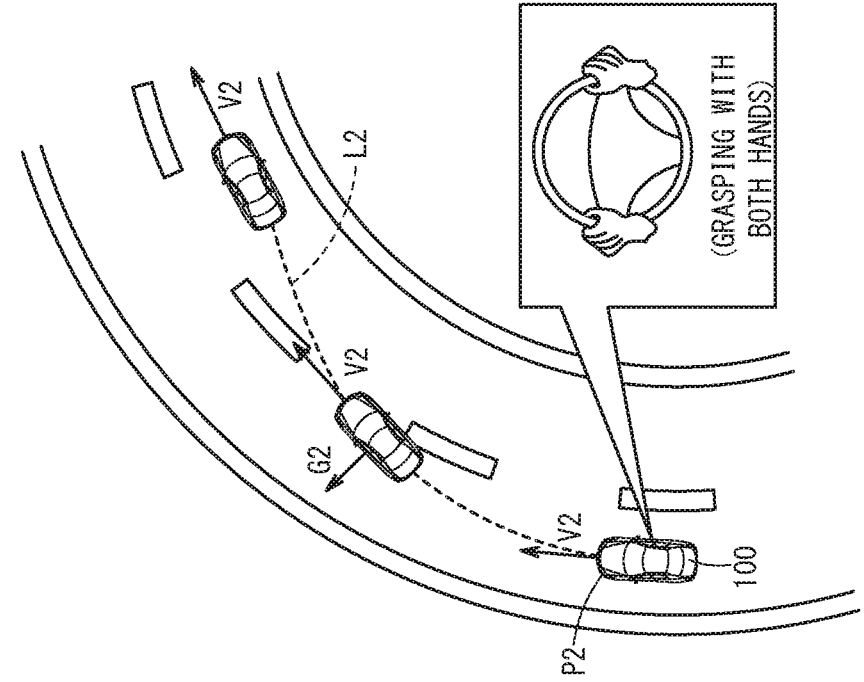
FIG. 6A is a diagram showing the state of a lane change performed in step S8 of FIG. 3.

FIG. 6A shows the state of a lane change performed in step S8 of FIG. 3. When the host vehicle 100 travels through the point P2, an action plan to effect a lane change is created. A planned travel trajectory L2 is created in accordance with creation of the action plan. In this instance, if the lateral G force G2, which is set in the data of the planned travel trajectory L2, is greater than or equal to a predetermined value (step S5 of FIG. 3: YES), the state at which the steering wheel is grasped is determined. If the steering wheel is being grasped with one hand (step S7 of FIG. 3: one hand), the planned travel trajectory L2 is corrected to a planned travel trajectory L2'. The travel velocity V2', which is set in the planned travel trajectory L2' after correction thereof, is decelerated so as to be lower than the travel velocity V2 that is set in the initial planned travel trajectory L2. When the host vehicle 100 performs a lane change at the travel velocity V2' in accordance with the planned travel trajectory L2', the lateral G force G2' becomes smaller than the initial lateral G force G2. As a result, the driver can maintain a suitable driving posture even while grasping the steering wheel with one hand.

(3) Pattern 3

Figure 6B:
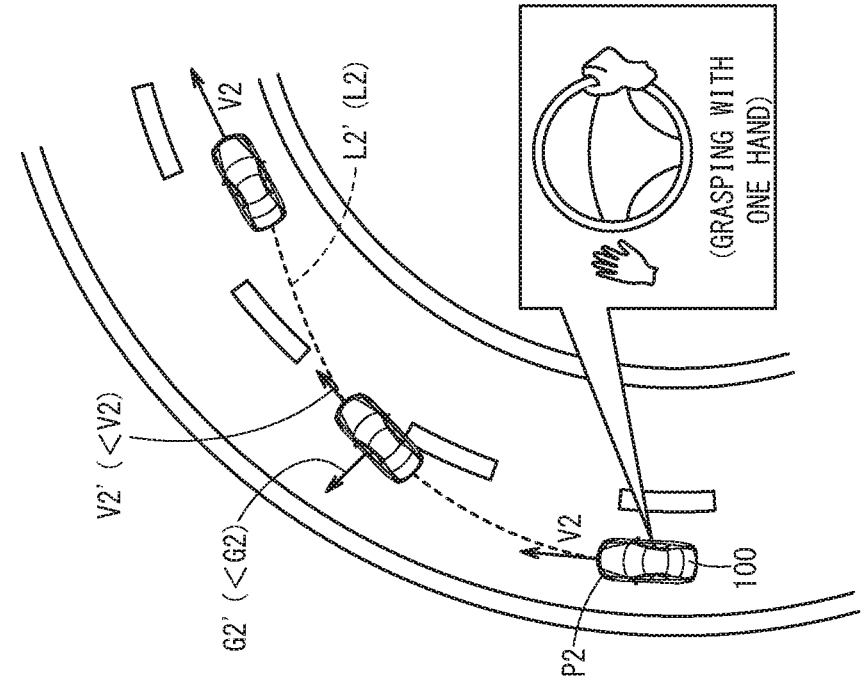
FIG. 6B is a diagram showing the state of a lane change performed in step S9 of FIG. 3.

FIG. 6B shows the state of a lane change performed in step S9 of FIG. 3. When the host vehicle 100 travels through the point P2, an action plan to effect a lane change is created. A planned travel trajectory L2 is created in accordance with creation of the action plan. In this instance, if the lateral G force G2, which is set in the data of the planned travel trajectory L2, is greater than or equal to a predetermined value (step S5 of FIG. 3: YES), the state at which the steering wheel is grasped is determined. If the steering wheel is being grasped with both hands (step S7 of FIG. 3: both hands), the planned travel trajectory L2 is maintained. The host vehicle 100 performs a lane change at the travel velocity V2 in accordance with the planned travel trajectory L2. At this time, although the lateral G force G2 is greater than or equal to the predetermined value, since the driver is grasping the steering wheel with both hands, the driver is capable of maintaining a proper driving posture.

(4) Pattern 4

Figure 7B:
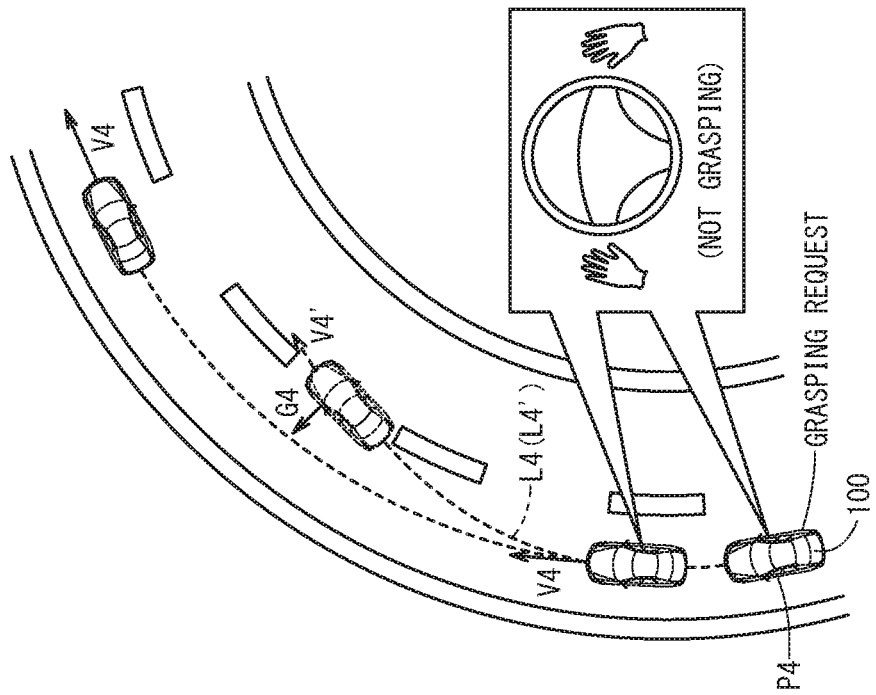
FIG. 7B is a diagram showing the state of a lane change performed in step S16 of FIG. 4.
Figure 7A:
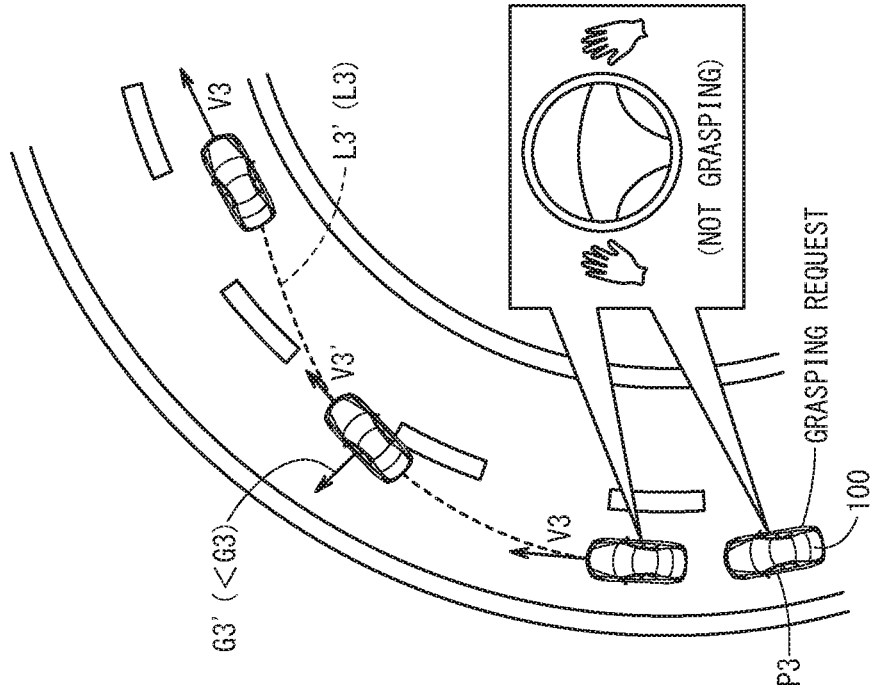
FIG. 7A is a diagram showing the state of a lane change performed in step S15 of FIG. 4.

FIG. 7A shows the state of a lane change performed in step S15 of FIG. 4. When the host vehicle 100 travels through the point P3, an action plan to effect a lane change is created. A planned travel trajectory L3 is created in accordance with creation of the action plan. In this instance, if the lateral G force G3, which is set in the data of the planned travel trajectory L3, is greater than or equal to a predetermined value (step S5 of FIG. 3: YES), the state at which the steering wheel is grasped is determined. In the case of an absence of the grasped state (step S6 of FIG. 3: absent), a request to grasp the steering wheel is made (step S10 in FIG. 4). In the case that a grasped state is not detected even after the predetermined time period T1 has elapsed (step S12 of FIG. 4: YES), the planned travel trajectory L3 is corrected to the planned travel trajectory L3'. The travel velocity V3', which is set in the planned travel trajectory L3' after correction thereof, is decelerated so as to be lower than the travel velocity V3 that is set in the initial planned travel trajectory L3. In the case that the degree of deceleration, which is set in the planned travel trajectory L3' after correction thereof, is less than the allowable value (step S14 of FIG. 4: YES), the planned travel trajectory L3' after correction thereof is used without modification. When the host vehicle 100 performs a lane change at the travel velocity V3' in accordance with the planned travel trajectory L3', the lateral G force G3' becomes smaller than the initial lateral G force G3. As a result, the driver can maintain a suitable driving posture even though the steering wheel is not being grasped.

(5) Pattern 5

FIG. 7B shows the state of a lane change (no lane change) performed in step S16 of FIG. 4. When the host vehicle 100 travels through the point P4, an action plan to effect a lane change is created. A planned travel trajectory L4 is created in accordance with creation of the action plan. In this instance, if the lateral G force G4, which is set in the data of the planned travel trajectory L4, is greater than or equal to a predetermined value (step S5 of FIG. 3: YES), the state at which the steering wheel is grasped is determined. In the case of an absence of the grasped state (step S6 of FIG. 3: absent), a request to grasp the steering wheel is made (step S10 in FIG. 4). In the case that a grasped state is not detected even after the predetermined time period T1 has elapsed (step S12 of FIG. 4: YES), the planned travel trajectory L4 is corrected to the planned travel trajectory L4'. The travel velocity V4', which is set in the planned travel trajectory L4' after correction thereof, is decelerated so as to be lower than the travel velocity V4 that is set in the initial planned travel trajectory L4. In the case that the degree of deceleration, which is set in the planned travel trajectory L4' after correction thereof, is greater than or equal to the allowable value (step S14 of FIG. 4: NO), the lane change is canceled. At this time, the host vehicle 100 performs a lane keeping operation and remains in the current travel lane.

[4. Summary of the Present Embodiment]

The vehicle control device 24 according to the present embodiment is equipped with the trajectory generating unit 56 which generates a planned travel trajectory for the host vehicle 100 at a time of making a lane change, the vehicle motion determining unit 70 which determines a value indicative of a motion of the vehicle which is generated in the vehicle transverse direction of the host vehicle 100, on the basis of the planned travel trajectory generated by the trajectory generating unit 56, and the grasping request unit 74 which requests grasping of the steering wheel in the case that the value indicative of the vehicle motion is greater than or equal to a predetermined value. In accordance with this configuration, in the case that movement of the vehicle in the vehicle transverse direction increases due to making the lane change, it is possible to request that the driver grasp the steering wheel, and therefore, the driver can ride in an appropriate posture suitable for operating the vehicle. More specifically, by grasping the steering wheel, the driver can resist the lateral G force.

The vehicle control device 24 is equipped with the lateral G sensor 46 that detects a lateral G force, or the yaw rate sensor 48 that detects an angular velocity about a vertical axis, as values indicative of the vehicle motion.

The vehicle control device 24 is further equipped with the vehicle control unit 58 that automatically controls the motion of the host vehicle 100 at a time of making a lane change, and the grasping detection unit 72 that detects whether or not the steering wheel is grasped by the driver of the host vehicle 100. The vehicle control unit 58 changes the vehicle motion of the host vehicle 100 differently (step S8, step S9, step S15, step S16) based on whether it is detected (step S6: grasping present) or whether it is not detected (step S6: grasping absent) by the grasping detection unit 72 that grasping of the steering wheel has occurred, after grasping of the steering wheel has been requested by the grasping request unit 74 (step S10, step S12: NO). In accordance with such a configuration, an appropriate vehicle control can be performed depending on the state at which the steering wheel is grasped by the driver.

The grasping detection unit 72 detects the level at which the steering wheel is grasped (step S6, step S7), and the vehicle control unit 58 controls the motion of the host vehicle 100 in accordance with the level detected by the grasping detection unit 72. In accordance with such a configuration, an appropriate vehicle control can be performed depending on the level at which the steering wheel is grasped by the driver, for example, whether the steering wheel is being grasped with one hand or with both hands.

In the case that a degree of deceleration, which is greater than or equal to a predetermined deceleration, is required to make the motion of the host vehicle 100 an acceptable vehicle motion (step S14), the vehicle control unit 58 stops the automated control that carries out the lane change (step S16). In accordance with this configuration, an excessive deceleration due to making the lane change can be suppressed, and traveling can be performed in accordance with the intention of a driver who does not desire to decelerate.

The vehicle control device 24 is equipped with the notification control unit 64, which issues a notification that a deceleration control is being performed, in the event that a deceleration control for the host vehicle 100 is to be carried out by the vehicle control unit 58. In accordance with this configuration, it is possible to cause a driver who does not desire to decelerate to select to take over responsibility for driving in advance.

The vehicle control device according to the present invention is not limited to the embodiment described above, and it is a matter of course that various modified or additional configurations could be adopted therein without deviating from the essence and gist of the present invention.

What is claimed is:

1. A vehicle control device disposed in a vehicle that is capable of making a lane change automatically, comprising:
    a trajectory generating unit configured to generate a planned travel trajectory for the vehicle at a time of making the lane change;
    a vehicle motion determining unit configured to determine a value indicative of a motion of the vehicle that occurs in a vehicle transverse direction of the vehicle, on the basis of the planned travel trajectory generated by the trajectory generating unit;
    a grasping request unit configured to request grasping of a steering wheel in a case that the value indicative of the vehicle motion is greater than or equal to a predetermined value;
    a vehicle control unit configured to automatically control the motion of the vehicle at the time of making the lane change; and
    a grasping detection unit configured to detect whether or not the steering wheel is grasped by a driver of the vehicle;
    wherein the vehicle control unit changes the motion of the vehicle differently based on whether it is detected or whether it is not detected by the grasping detection unit that the steering wheel is grasped, after grasping of the steering wheel has been requested by the grasping request unit.

2. The vehicle control device according to claim 1, further comprising a lateral G sensor configured to detect a lateral G force as the value indicative of the vehicle motion.

3. The vehicle control device according to claim 1, further comprising a yaw rate sensor configured to detect an angular velocity about a vertical axis as the value indicative of the vehicle motion.

4. The vehicle control device according to claim 1, wherein:
    the grasping detection unit detects a level at which the steering wheel is grasped; and
    the vehicle control unit controls the motion of the vehicle in accordance with the level detected by the grasping detection unit.

5. The vehicle control device according to claim 1, wherein, in the case that a degree of deceleration, which is greater than or equal to a predetermined deceleration, is required to make the motion of the vehicle an acceptable vehicle motion, the vehicle control unit stops the automated control that carries out the lane change.

6. The vehicle control device according to claim 1, further comprising a notification control unit configured to issue a notification that a deceleration control is being performed, in the case that the deceleration control for the vehicle is to be carried out by the vehicle control unit.

* * * * *